US012651073B2

(12) United States Patent
Alibrahim et al.

(10) Patent No.: US 12,651,073 B2
(45) Date of Patent: Jun. 9, 2026

(54) ONE OR MORE DEVICES PROVIDING IMPROVED SECURITY FOR ANY DATABASE INCLUDING DISTRIBUTED APPLICATIONS AND SMART CONTRACTS

(71) Applicant: omProtect LLC, Front Royal, VA (US)

(72) Inventors: Omar Alibrahim, Yarmouk (KW); Majid Ahmed Malaika, Riyadh (SA); Timothy Rude, Front Royal, VA (US)

(73) Assignee: omPROTECT LLC, Front Royal, VA (US)

( * ) Notice: Subject to any disclaimer, the term of this patent is extended or adjusted under 35 U.S.C. 154(b) by 365 days.

(21) Appl. No.: 18/483,964

(22) Filed: Oct. 10, 2023

(65) Prior Publication Data

US 2024/0119161 A1 Apr. 11, 2024

Related U.S. Application Data

(60) Provisional application No. 63/379,041, filed on Oct. 11, 2022.

(51) Int. Cl.
G06F 21/57 (2013.01)
G06F 9/455 (2018.01)
G06F 21/10 (2013.01)

(52) U.S. Cl.
CPC ........ G06F 21/577 (2013.01); G06F 9/45558 (2013.01); G06F 21/10 (2013.01); *G06F 2009/45587* (2013.01); *G06F 2221/033* (2013.01)

(58) Field of Classification Search
CPC ................... G06F 21/577; G06F 21/10; G06F 2009/45587; G06F 2221/033; G06F 9/45558; H04N 7/16
See application file for complete search history.

(56) References Cited

U.S. PATENT DOCUMENTS

| | | | | |
|---|---|---|---|---|
| 10,367,645 | B2 * | 7/2019 | Dechu | H04L 9/3239 |
| 2018/0115425 | A1 * | 4/2018 | Dechu | H04L 9/3239 |
| 2018/0218364 | A1 * | 8/2018 | Cantrell | G06Q 20/36 |
| 2019/0306173 | A1 * | 10/2019 | Reddy | H04L 63/0281 |
| 2020/0082025 | A1 * | 3/2020 | Zhou | G06F 16/11 |
| 2020/0204557 | A1 * | 6/2020 | Singh | H04L 67/306 |
| 2022/0263896 | A1 * | 8/2022 | Shah | H04L 69/08 |

* cited by examiner

*Primary Examiner* — Frantz B Jean
(74) *Attorney, Agent, or Firm* — PATENT PORTFOLIO BUILDERS PLLC

(57) ABSTRACT

One or more devices providing improved security for any database including a smart contract or distributed application executing on a virtual machine. Embodiments provide monitoring and incident response for execution of the smart contract or distributed application running on a blockchain, or any other distributed ledger technology. An aspect of some embodiments is detection of anomalies when executing the smart contract or distributed application in real-time. Embodiments may immediately respond to the detected anomalies, e.g., by switching control to a human operator, a reactive machine, or a machine learning operator. In an embodiment, operator response may include i) freezing execution, ii) resuming execution, or iii) reverting execution. Accordingly, in the event of an erroneous or fraudulent transaction, the operator machine may revert the smart contract or distributed application to a previously valid state, thereby preventing loss of digital assets or funds allocated to the smart contract or distributed application.

16 Claims, 9 Drawing Sheets

ONE OR MORE DEVICES PROVIDING IMPROVED SECURITY FOR ANY DATABASE INCLUDING DISTRIBUTED APPLICATIONS AND SMART CONTRACTS

CROSS-REFERENCE TO RELATED APPLICATION(S)

This application claims priority to and benefits of U.S. Provisional Application No. 63/379,041, filed Oct. 11, 2022, the entire contents of which are incorporated herein by reference.

BACKGROUND

1. Technical Field

The present disclosure provides improved security for any database including distributed applications (dApps) and smart contracts. For example, it discloses, inter alia, a novel device that provides real-time monitoring and incident response to ensure secure and fraud-free execution of a smart contract on top of any distributed ledger technology (DLT).

2. Description of the Related Art

This section may include information that describes one or more of the related art elements, and may also include recognitions of the inventors that were not publicly disclosed or available before the effective date of the present application. The language of the description herein must be read in its proper technological context, i.e., as a specification for a physical computer network running a computational system and methods that directly translate to physical implementations.

"Distributed ledger technology" (DL T) is a consensus of replicated, shared, and synchronized records of transactions managed by multiple online hardware systems (i.e., computers).

A "blockchain" is a form of DLT in which transactions are recorded with an immutable cryptographic signature.

A "virtual machine" is an emulation of a computer that executes the bytecode of low-level instructions for some program.

A "smart contract" refers to a computer program that runs inside a virtual machine running on a DLT. The source code of the smart contract specifies the logic for the terms of agreement between online computers initiating and processing transactions on the DLT.

"Running the smart contract" refers to the process of converting the source code of a smart contract, written in a high-level (e.g. Turing-complete) programming language into a low-level language then translated into machine-readable scripting code and executed by the virtual machine.

The execution of a smart contract is initiated through a "transaction" from the caller and addressed to the contract instance on the DLT.

The term "distributed application" refers to a program that is blockchain-based or DLT-enabled. A distributed application typically consists of some front-end code that communicates with a back-end smart contract instance.

As is understood by one of ordinary skill in the art, "about" is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

As is understood by one of ordinary skill in the art, "real-time" means occurring at precisely the same time that the process is occurring, and is inclusive of an acceptable range of deviation thereafter considering execution and/or communication delays, considering the process in question and the communication delays typically associated with the process in question.

DLTs possess the following key characteristics:

"Ledger"—An append-only list of records linked in successive order based on their timestamps. A new record is always appended to the end of the ledger. Each record contains a set of transactions and is of fixed length.

"Immutable Records"—Records within the ledger are attestable and cannot be deleted or modified.

"Shared Information"—The ledger and/or its data are shared and/or replicated among multiple computer hardware.

"Distributed System"—Transactions are verified and added to a record. A record is committed to the ledger through a consensus protocol running between multiple computers that belong to a network.

Based on the characteristics outlined above, immutability is a design property of the DLT which ensures that any committed records on the ledger will stay permanent. This property is characterized by a) respect for the strict order of records on the ledger and b) the integrity of the data embodied in these records.

Immutability is a necessary condition for distributed ledger applications such as crypto-assets and tokenization. Without it, preventing double-spending—a potential flaw in digital tokenization schemes that means the same digital token can be spent more than once-would be exceptionally flawed or practically infeasible. This problem generally leads to inflation by creating an excessive number of copied tokens that did not previously exist, thus reducing the weight of an individual token.

DLT generally solves the double-spending problem through the use of a consensus protocol, a distributed agreement method in a computer network to synchronize a global image of the ledger that is free from conflicting transactions. Two notable approaches to consensus are used today, namely proof-of-work and proof-of-stake.

The immutability of records on the ledger means transactions cannot be reversed. This can be problematic when the committed transactions, for whatever reason, are discovered to be fraudulent. In that case, the recovery of the ledger becomes necessary.

Currently, there is no systematic approach to overcoming the irreversibility of transactions other than to fork the ledger. A fork can be unintentionally created for a short period because of the difficulty of reaching rapid consensus among a majority of computers in the DLT network. Conversely, a fork can also be long-lived, or even persistent, in the case when no consensus is reached, resulting in a split decision between computers about what modifications to approve on the DLT and which copy of the ledger represents the authoritative instance. There are several reasons for modifications in the DLT protocol including: 1) to reverse the effects of hacking or fraud; 2) to add new functionality to correct design flaws; and 3) to avert catastrophic bugs on the ledger.

Persistent forks can be classified into two types:

Type I—A "soft fork" occurs when transactions initiated by patched computers are accepted by both the old and new ledgers. This type of fork is backwards compatible. Type II—A "hard fork" occurs when the patched computers are not allowed to write to the old ledger. Neither soft nor hard forks allow unpatched computers to write to the new ledger.

A smart contract consists of a set of functions and state variables. When a smart contract is deployed, an instance of it will reside at a specific address on the ledger, and be represented by an account that can transact on the ledger.

Despite the expressiveness and power of smart contracts and DLT, existing implementations lack the visibility and recovery mechanisms necessary to overcome execution flaws in real-time.

Due to the inherent property of immutability of the DLT, once a smart contract is deployed, it cannot be modified, but can only be destroyed with a special self-destruct function (if this is defined in the source code). Therefore, if the source code contains a security vulnerability or a logical flaw, the contract must be redeployed with a new patched instance to replace the existing vulnerable one. This is because when a smart contract is deployed, a transaction is created and the resulting bytecode from the compilation of the contract is committed to the ledger. Because data on the ledger is immutable, the committed bytecode for the deployed instance cannot be altered.

With this understanding, a malicious agent may exploit unfixed vulnerabilities in a flawed smart contract. As explained previously, when the source code is modified, the smart contract must be redeployed with a new instance on the ledger for these modifications to take effect.

However, this incurs some overhead and introduces new challenges that did not exist before with tokenized-based applications. Specifically, there are two challenges: a) destroying or disabling the old instance of the contract and forcing every user to use the new one; and b) migrating the state and balance, including any crypto-assets in the user's possession, from the old instance to the new one.

The implications of abusing a flawed smart contract can be severe. A malicious agent may invoke an exposed function with crafted arguments, which could be performed multiple times with tailored values, and which could:

A. cause fraudulent transactions to execute by exploiting code re-entrance vulnerabilities, e.g., a race condition exploited to steal crypto-assets from a smart contract's balance;

B. destroy a deployed instance of the smart contract by notoriously invoking its destructor function, thereby eliminating its future use; or C. transition the execution thread of a smart contract to a deadlock state that will render it useless, thereby causing the account associated with it to freeze and any crypto-assets in its withholdings to become non-transferable.

As mentioned above, code re-entrance is a condition exploited by a malicious agent under which a non-recursive function can be re-entered before its termination, thereby resulting in an execution loop that could cause additional (unauthorized) transfers of crypto-assets to an account that belongs to the malicious agent.

The aforementioned attacks highlight the various types of information and software hacking that can be launched against smart contracts, which are typically identified by seeking vulnerabilities in the source code.

In the software industry, one of the methods used to locate defects in source code is static code analysis. Static code analysis is the process of examining computer programs without actually performing the runtime execution of the code. Typically, this type of analysis is automated with a software tool that may be guided by human knowledge. In contrast, dynamic code analysis is a type of analysis performed during the execution of a program.

Static analysis can be applied to prove the correctness of programs, or locate defects in source code. Two approaches can be used to prove correctness:

A. "Model checking" consists of a systematically exhaustive exploration of the mathematical model of the system expressed as source code.

B. "Formal verification of software programs" involves proving that a program conforms to a specification.

Various methods have been developed to seek out vulnerabilities and identify defects in source code. In the simplest form, lexical analysis and pattern matching can be applied to convert the syntax of a source code into tokens that are checked against a set of strings or byte patterns known to cause faults, such as memory corruption with null strings.

Algorithmic approaches like control flow analysis trace the control path of a program by representing the function call sequence via an abstract graph. Conversely, taint analysis follows the data path of a program to identify variables that have been tainted with user-controllable input, then flags the program as vulnerable if it can trace a tainted variable that gets passed to a sink without being sanitized. Symbolic execution explores possible execution paths for a program without any concrete input values. Instead, it keeps track of the symbolic state of execution and leverage constraint solvers to verify the properties.

Another approach is "data-driven analysis." This type of analysis is performed by collecting a large number of source code samples as a dataset for machine learning to infer coding rules and then using the results as baseline to check for conformity.

In "dynamic analysis," a program is run on a real or virtual processor to uncover potentially exploitable software bugs. This generally requires some sort of instrumentation and a setup of the software execution environment for measuring the dynamic behavior when running a program. Different types of dynamic analysis exist today. For example, code coverage analysis discovers portions of code within the program that is being exercised by test cases. It is performed to ensure that an adequate portion of possible behaviors for a program has been observed. Dynamic analysis is also used in analyzing program memory allocation, which focuses on finding memory leaks, errors, and race conditions. Similarly, performance analysis uses dynamic techniques to trace software applications at runtime and captures data that can be used to analyze and identify causes of poor performance.

"Fault localization" refers to discovering buggy code or statements via some test cases that prune for logically flawed code segments. The method used to achieve this is known as program slicing, a method that consists of reducing the program to a minimum form to produce the selected behavior for the purpose of debugging and locating the source of errors.

An automated software testing method, known as "fuzz testing," or "fuzzing," can be used to uncover defects by providing unexpected input to a target program and observing for exceptions. For the purpose of security, fuzz testing can be adopted to generate input that crosses the trust boundary of a program. These inputs are usually semi-valid, meaning they will take some specified structure, such as a file format or protocol, that will not be directly rejected by parsers, but expose corner cases that have not been properly handled by the program.

The term "dynamic application security testing" refers to the ability to run security tests against a running program, usually via automated tools. These tools are available as open-source projects or commercial software, and may vary in coverage, efficiency, and accuracy.

A "software library" is a collection of pre-written code, specifications, templates, and other resources which are used by computer programs. It may be imported to a computer program to implement additional functionality or to automate processes. A program may be at risk if the imported library contains flaws. To address this risk, safe libraries were introduced to provide reusable and trusted code for third-party programs. In order to minimize the risks of flaws, safe libraries have been carefully reviewed and tested by the community to make sure that programs adhere to proper coding standards, including security considerations.

Using design patterns in the development of smart contracts can reduce the surface of exposure to cyber-attacks, thereby enforcing a consistent state for programs and minimizing risks. These patterns can be thought of as desirable templates or formalized best practices for software development, which can be used to create secure programs. Different types of design patterns exist today. These patterns include circuit breakers pattern, oracle data access pattern, and pull-over-push pattern to name a few.

The methods mentioned above represent a non-comprehensive summary of related art practices in software security, which occur across various phases of the software development lifecycle, including, design, implementation, and testing.

It is important to note that following agile methods for software development and testing can be cost-prohibitive for smart contracts. In fact, flaws identified through static or dynamic code analysis cannot be remediated immediately when a smart contract goes to production.

Due to the immutability of the ledger, deployed instances of the smart contract cannot be modified once they are committed to the ledger. To work around this issue, the old instance of the contract must be destroyed, and its state and balance must be transferred to the new instance.

More often than not, smart contracts are deployed with hidden vulnerabilities that are missed by static analyzers and dynamic analysis tools, thereby leaving them at risk when they become live in production.

Applying design patterns and safe libraries can reduce the scope and impact of exploits when writing smart contracts by disabling or limiting the use of risky functionalities, or by placing a cap on the funds a contract can hold at a single point in time. In addition, the security of smart contracts can be further enhanced with patterns that use secure transfer and recovery of crypto-assets. To sum up, design patterns and safe libraries can complement other methods by minimizing the attack surface.

SUMMARY

According to an embodiment, one or more devices providing improved security for a smart contract or distributed application executing on a virtual machine may be provided. The one or more devices may include one or more network interfaces, one or more processors, and one or more memories including instructions that upon execution by the one or more processors cause the one or more devices to perform operations. The operations may include receiving, via the one or more network interfaces, a transaction initiated by a caller with the smart contract or distributed application of the virtual machine; examining contents of the transaction to determine, using a plurality of stored security enforcement files stored in the one or more memories, whether the contents of the transaction include attributes satisfying a plurality of criteria for access to the smart contract or distributed application; rejecting the transaction to the smart contract or distributed application upon determining that the contents of the transaction do not include the attributes satisfying the plurality of criteria; and transmitting, via the one or more network interfaces, the transaction to the smart contract or distributed application upon determining that the contents of the transaction do include the attributes satisfying the plurality of criteria.

According to another embodiment, one or more devices providing improved security for a smart contract or distributed application executing on a virtual machine may be provided. The one or more devices may include one or more network interfaces, one or more processors, and one or more memories including instructions that upon execution by the one or more processors cause the one or more devices to perform operations. The operations may include receiving an instance of about real-time information regarding a state of the virtual machine during execution of the smart contract or distributed application; examining the instance of about real-time information to determine, using a rules engine stored in the one or more memories, whether an anomaly is present within the instance of about real-time information; freezing the execution of the smart contract or distributed application upon determining that the anomaly is present within the instance of about real-time information; and sending a resume command to continue the execution of the smart contract or distributed application upon determining that the anomaly is not present within the instance of about real-time information, or upon receiving a resume instruction.

DETAILED DESCRIPTION OF THE EMBODIMENTS

The disclosure will now be described with reference to certain embodiments and not by way of limitation. Modifications to embodiments and combinations thereof will be apparent to one of ordinary skill in the art and should be considered to be a part of the scope of the disclosure.

Figure 1:
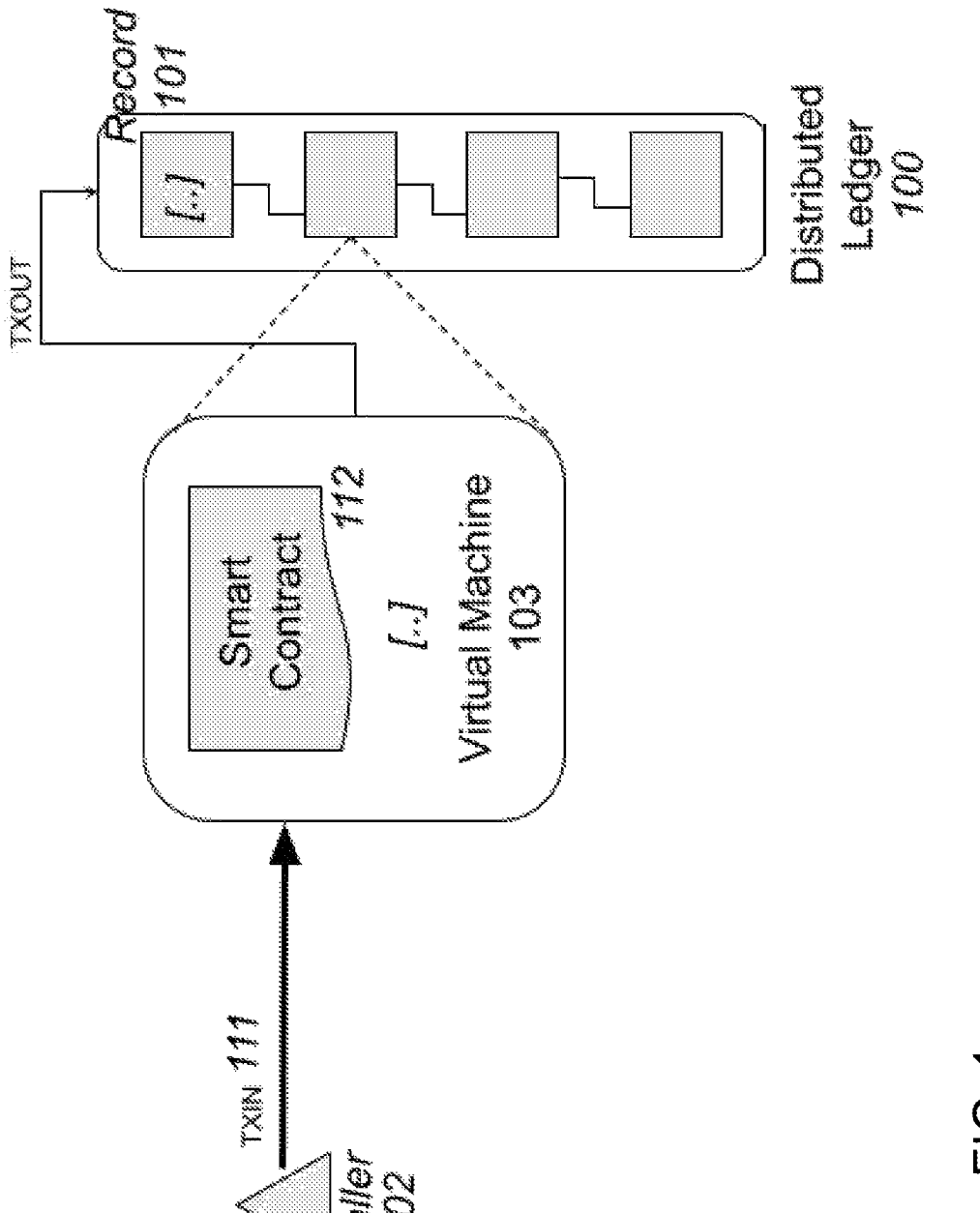
FIG. 1 illustrates a high-level functional diagram for the architecture of a related art system.

FIG. 1 illustrates a high-level functional diagram for the architecture of a related art system. As shown, the system consists of a distributed ledger 100, i.e., a global data structure built through a consensus among computers in a network. Any entity, legitimate or malicious, can communicate with the distributed ledger 100 and transact with any deployed smart contract 112.

Figure 2:
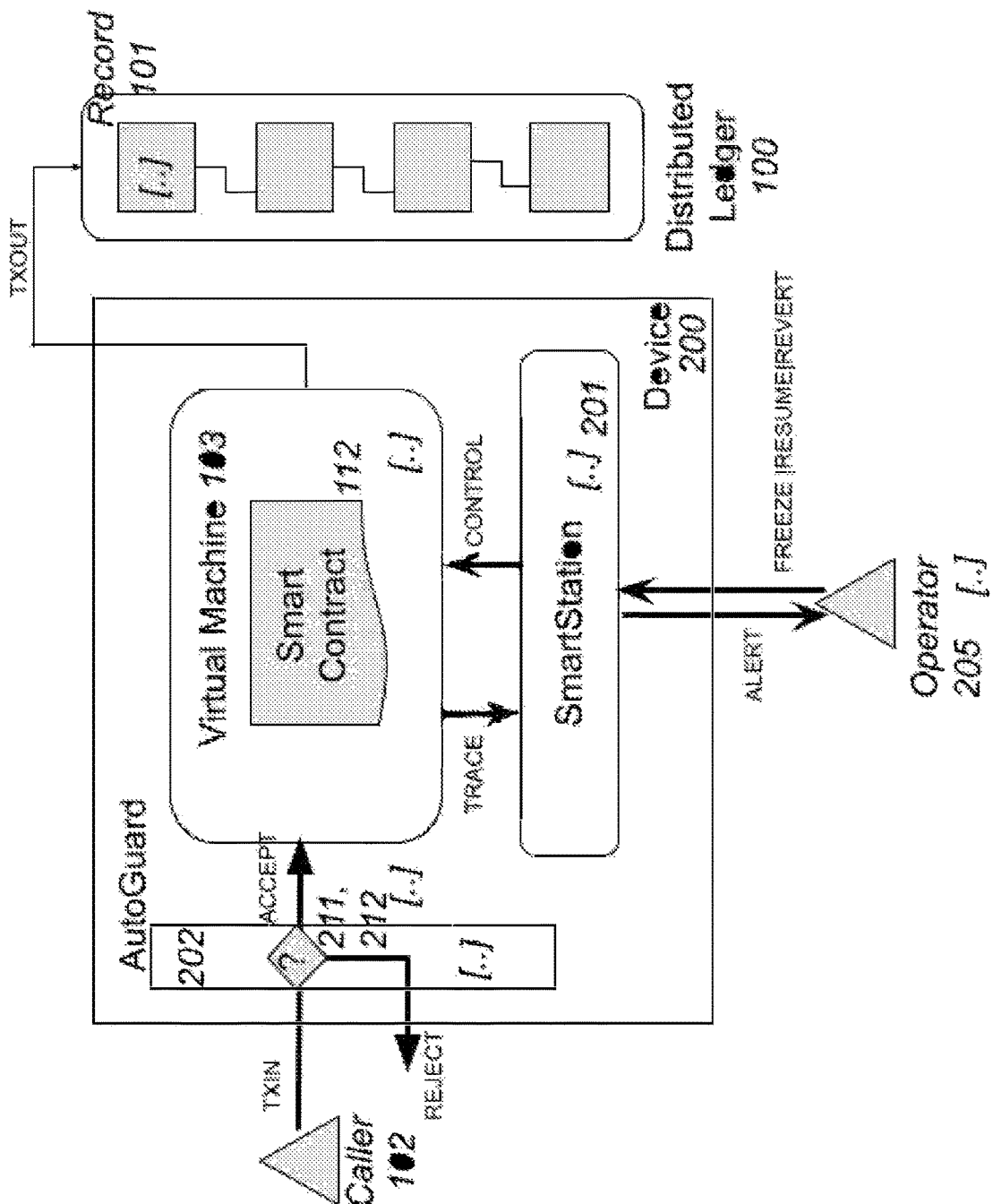
FIG. 2 shows a high-level functional block diagram of an embodiment of the disclosure.

FIG. 2 shows a high-level functional block diagram of an embodiment of the disclosure 200, which is added to the virtual machine 103. According to embodiments, these aspects of the disclosure may be embodied as one or more computing devices provided to improve security for a smart contract or distributed application executing on a virtual machine. Such embodiments may be referred to herein as AutoGuard 202 and/or SmartStation 201. AutoGuard 202 filters, monitors, and disrupts any unauthorized, fraudulent, and malformed or malicious input transactions (TXIN). In contrast, the SmartStation 201 enforces monitoring, analysis, and online recovery of a smart contract from flawed execution states.

Figure 3:
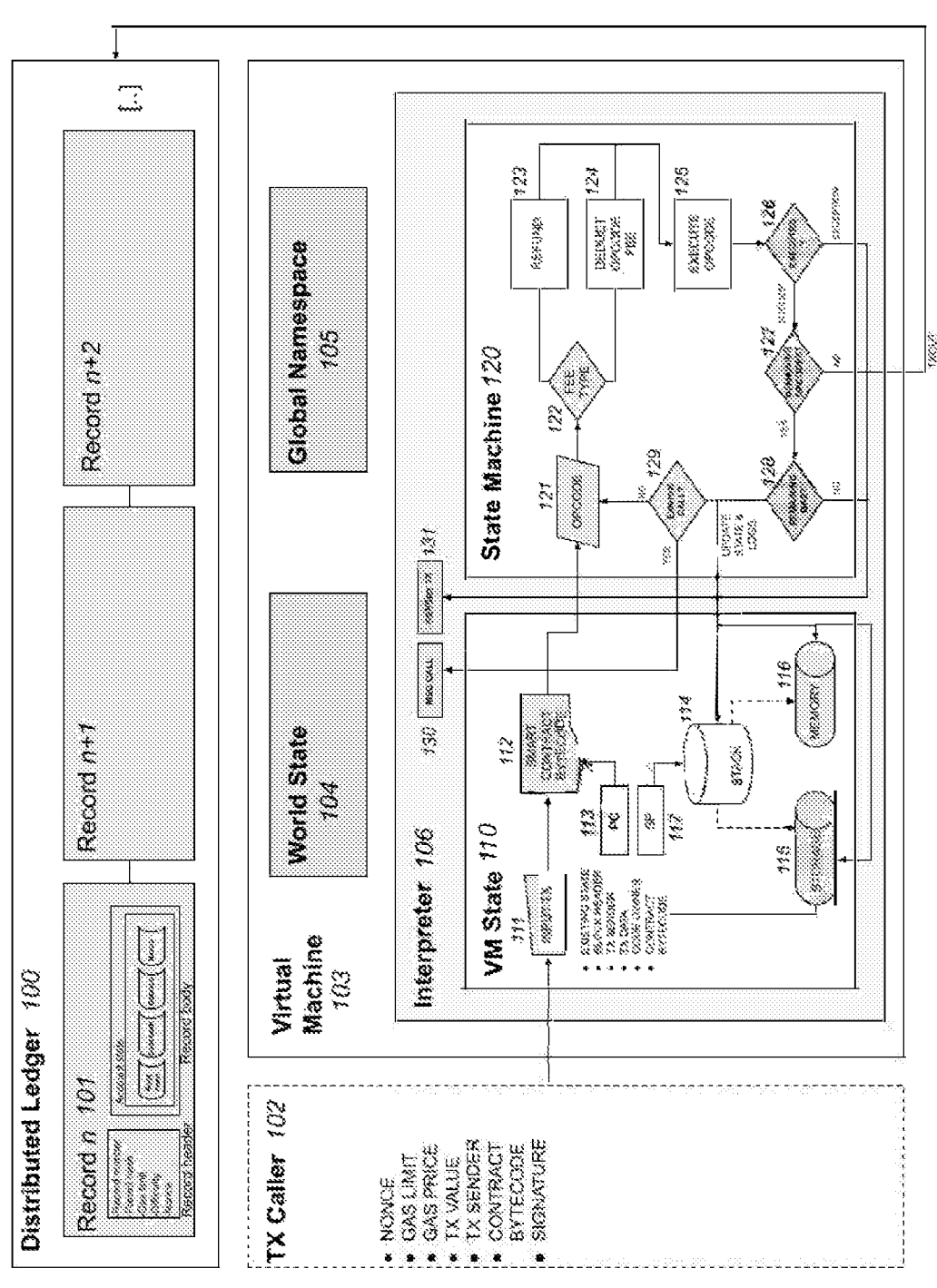
FIG. 3 is a more detailed representation of FIG. 1.

FIG. 3 is a more detailed representation of FIG. 1. As shown, each node of the distributed ledger 100 embeds the virtual machine 103, i.e., a sandbox for the execution of smart contracts. The virtual machine 103 executes a smart contract in a standalone environment but delivers the output of the execution via an output transaction that is shared among the nodes in an overlay computer network, to be added to the distributed ledger 100.

As depicted, the distributed ledger 100 consists of a series of consecutive records where each record 101 has a header and body. The record header includes the field's record number, cryptographic hash of the parent record, cryptographic nonce, and other parameters. Meanwhile, the record body includes information about the transactions committed on the distributed ledger 100.

The virtual machine 103 is a Turing-complete execution sandbox that is bounded by the notion of the "gas,": a unit of measure that amounts to the computational effort required to execute smart-contract opcodes. The total amount of computation that can be performed is intrinsically limited by the amount of gas provided, which is funded by the user 102 when executing a function on the smart contract. The virtual machine 103 is composed of the world state 104, namespace 105, and interpreter 106. The global variables are stored in the world state 104 and namespace 105.

The virtual machine 103 embodies the interpreter 106, which is composed of the virtual machine state 110 and the state machine 120. The virtual machine state 110 contains the transaction buffer 111, program bytecode 112, program counter (PC) 113, execution stack 114, storage 115, memory 116, and stack pointer 117. In contrast, the state machine 120 contains the sequential logic circuit 121-129 to execute the instructions of the interpreter. The memory 116 is a word-addressed byte array, which does not persist between transactions. The virtual machine 103 does not follow the standard von Neumann architecture for storing program code in a generally accessible location in the memory or storage. Instead, programs are stored separately in virtual read-only memory, interacted with solely through specialized instructions.

Figure 4:
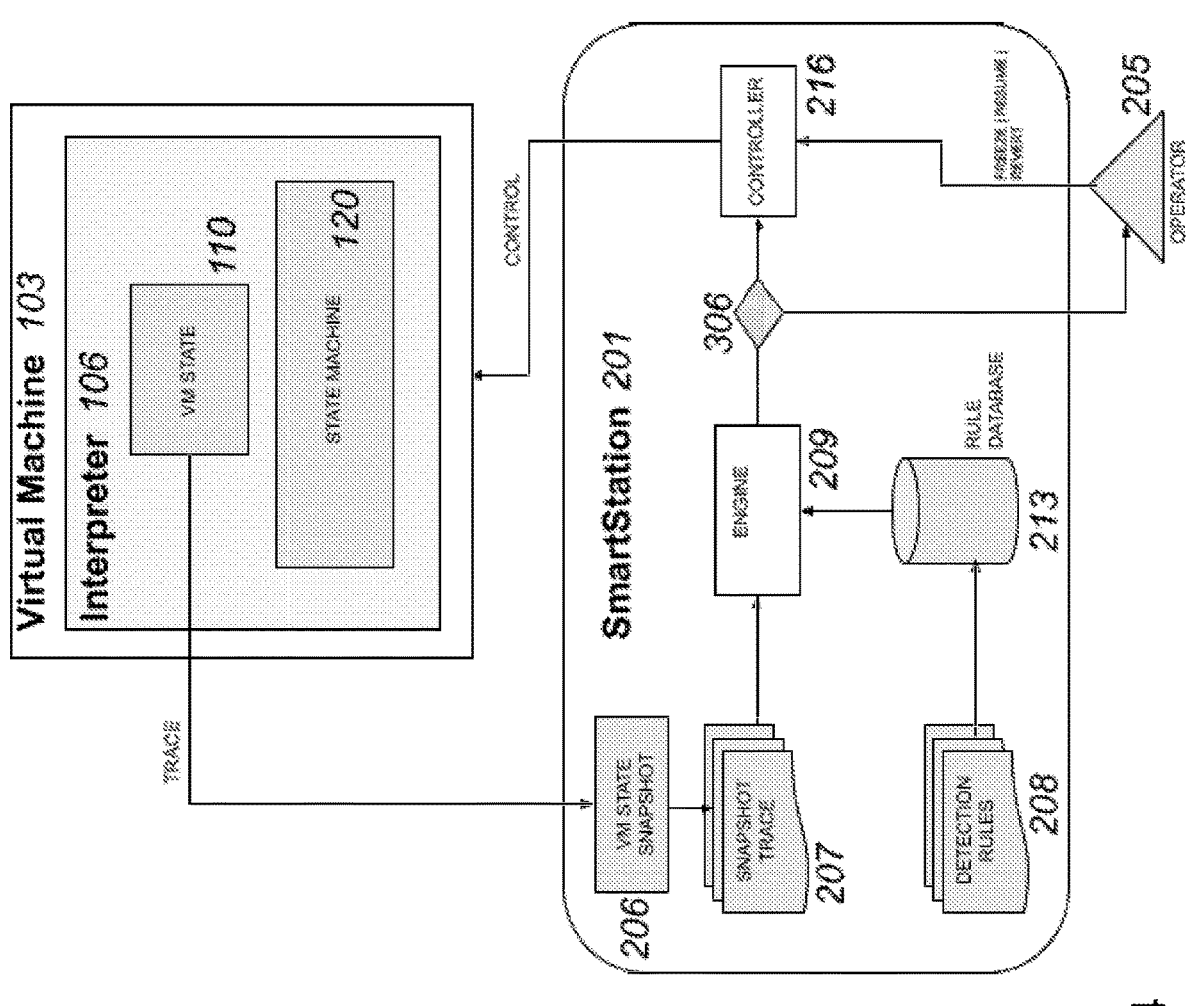
FIG. 4 shows an embodiment of the SmartStation in more detail with some of its constituents.

FIG. 4 shows an embodiment of the SmartStation 201 in more detail with all of its constituents. The SmartStation 201 acts as a watchdog for the execution of the virtual machine 103. It reads the state of the virtual machine 103 and contains an embedded logic to detect anomalies of the execution in real time. For example, the SmartStation 201 performs operations including receiving an instance of about real-time information regarding a state of the virtual machine during execution of the smart contract or distributed application, and examining the instance of about real-time information to determine, using a rules engine stored in one or more memories, whether an anomaly is present within the instance of about real-time information.

In addition, the SmartStation 201 can direct the course of execution of the smart contract by exercising one of the following operations: i) freeze execution, ii) resume execution, or iii) revert execution. This is achieved through the following process, if an anomaly is detected by the rule engine 209, it is forwarded to the operator 205 to make a decision 306. Otherwise, execution is resumed by the controller 216. For example, the SmartStation performs operations including freezing the execution of the smart contract or distributed application upon determining that the anomaly is present within the instance of about real-time information, or sending a resume command to continue the execution of the smart contract or distributed application upon determining that the anomaly is not present within the instance of about real-time information, or upon receiving a resume instruction.

Figure 5:
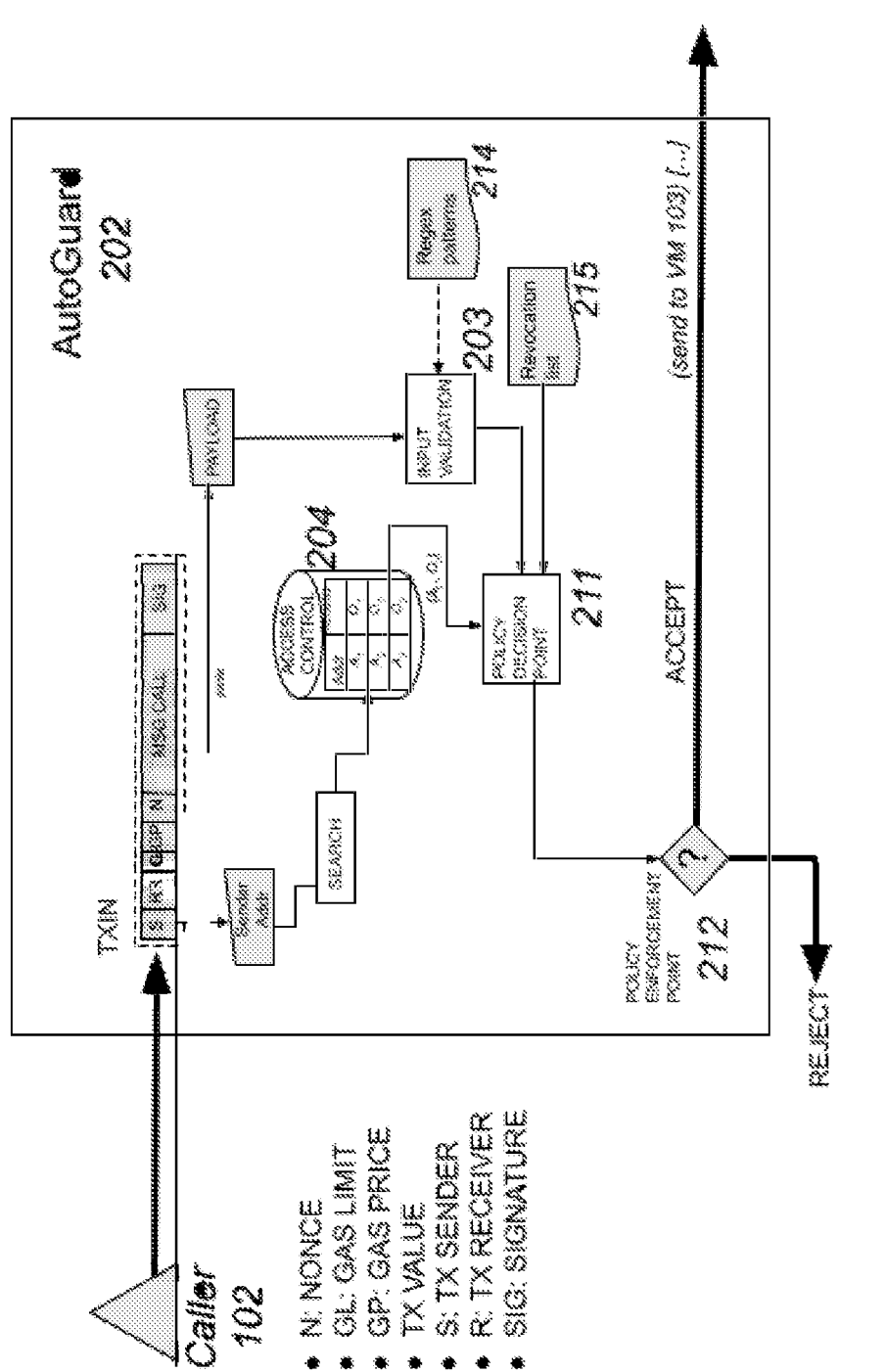
FIG. 5 shows an embodiment of the AutoGurard.

FIG. 5 shows and embodiment of the AutoGuard 202. Logically, the AutoGuard 202 behaves like a firewall that examines the content of TXIN initiated by the caller 102, and only allows transactions meeting criteria for access. For example, the AutoGuard 202 may perform operations including receiving, via one or more network interfaces, a transaction initiated by a caller with the smart contract or distributed application of the virtual machine, and examining contents of the transaction to determine, using a plurality of stored security enforcement files stored in one or more memories, whether the contents of the transaction include attributes satisfying a plurality of criteria for access to the smart contract or distributed application. AutoGuard 202 may perform operations including rejecting the transaction to the smart contract or distributed application upon determining that the contents of the transaction do not include the attributes satisfying the plurality of criteria, or transmitting, via the one or more network interfaces, the transaction to the smart contract or distributed application upon determining that the contents of the transaction do include the attributes satisfying the plurality of criteria. The AutoGuard 202 is composed of the following functional blocks.

The input validator 203 is a whitelist checker that explicitly examines identified pieces of data from the TXIN and returns a Boolean answer deciding whether to execute the transaction. It contains validation logic based on an import file of regular expression patterns 214. The patterns are imported during the device's setup but can also be updated during the operation of the device (if new patterns must be added or existing patterns removed). By default, the input validator 203 rejects all received inputs (i.e., returns the Boolean answer "false"), unless the data fields in the TXIN are properly formatted according to the regex rules 214.

The access control module 204 contains a mapping table for the sender address $A_i$ and a list of access objects $O_i$ queried by the sender address. This determines the access rights for the caller 102 in terms of executing smart-contract functions and reading or writing to its state variables. The access control module 204 builds a unique table map for each smart contract monitored by an embodiment 200. It compares the address of the caller with a whitelist of ledger addresses. Specifically, the access control module 204 contains a set of underlying rules that filter the TXIN using a whitelist of sender addresses. The rules are defined as follows: the subject is the sender address Ai, and the object Oi is the set of execution privileges that are granted. These privileges include the functions and state variables of the smart contract that are allowed to be called or accessed (read/written) by the subject. The type of access control module 204 to be employed is completely arbitrary; it may be discretionary-, role-, attribute-, or mandatory-based access control.

The policy decision point module 211 determines whether to authorize the TXIN based on the available information, including the attributes of the transaction, input validator 203 output, access control module 204 output, and revocation list 205. These authorization decisions are forwarded to the policy enforcement point module 212 that handles enforcement and forwarding of transactions to the virtual machine (103) for execution.

The operator 205 handles the response decisions for the detections obtained within an embodiment. The operator 205 can be configured in one of three modes: a) manual, b) reactive, or c) intelligent.

Figure 6:
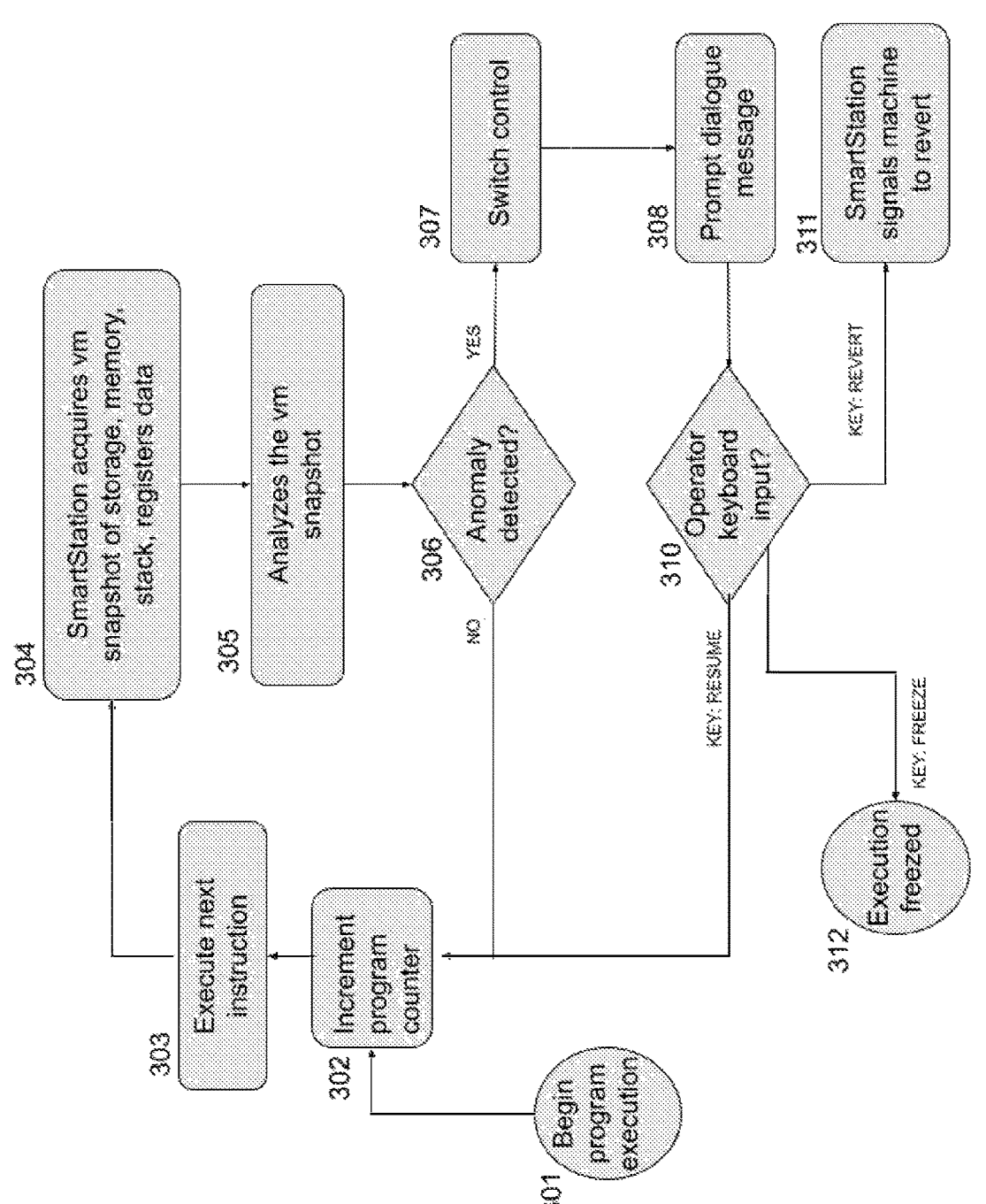
FIG. 6 shows the workflow for a manual mode configuration.

FIG. 6 illustrates the workflow for the manual mode configuration. As shown, when a smart contract program begins to execute inside the virtual machine 103, each opcode of the program goes through an execution loop 302-306. This loop involves executing the next opcode and collecting artifacts from the virtual machine 103 to be analyzed by the SmartStation 201. When an anomaly is detected, the program control is switched 307 (i.e., via a processor interrupt) to the SmartStation 201, and a prompt is presented to a human operator 308. In this state, the SmartStation 201 awaits a manual keyboard input from the human operator 310 who, based on their input, will determine the course of execution 311, 312 or 302.

Figure 7:
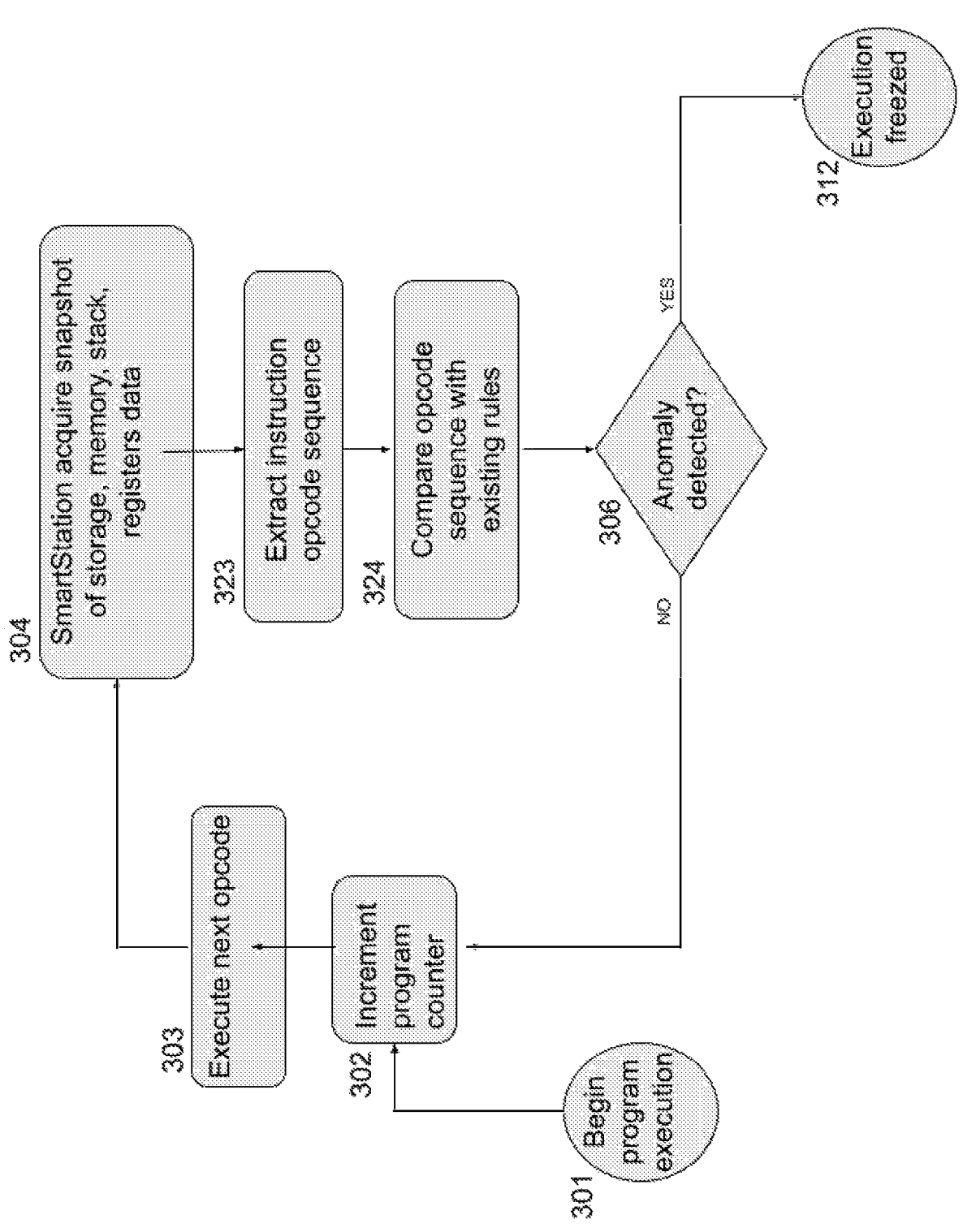
FIG. 7 shows the workflow for a reactive mode of configuration.

FIG. 7 shows the workflow for a reactive mode of configuration. As can be seen, this configuration has a shorter workflow than the manual mode of configuration because it does not require a response decision from the user. Similar to the manual mode of configuration, when the program begins its execution 301, it implements the program counter, and the next opcode is then executed 302, 303.

The SmartStation 201 acquires a snapshot of the execution trace, including the storage, memory, stack, and register data, and extracts the instruction opcode sequence 304, 323. Unlike the manual mode of configuration, in the reactive mode, the opcode sequence is compared to a set of rules that contains byte patterns of the opcode sequence 324. The result of this comparison is used to determine whether the execution should freeze or continue the execution loop.

Figure 8:
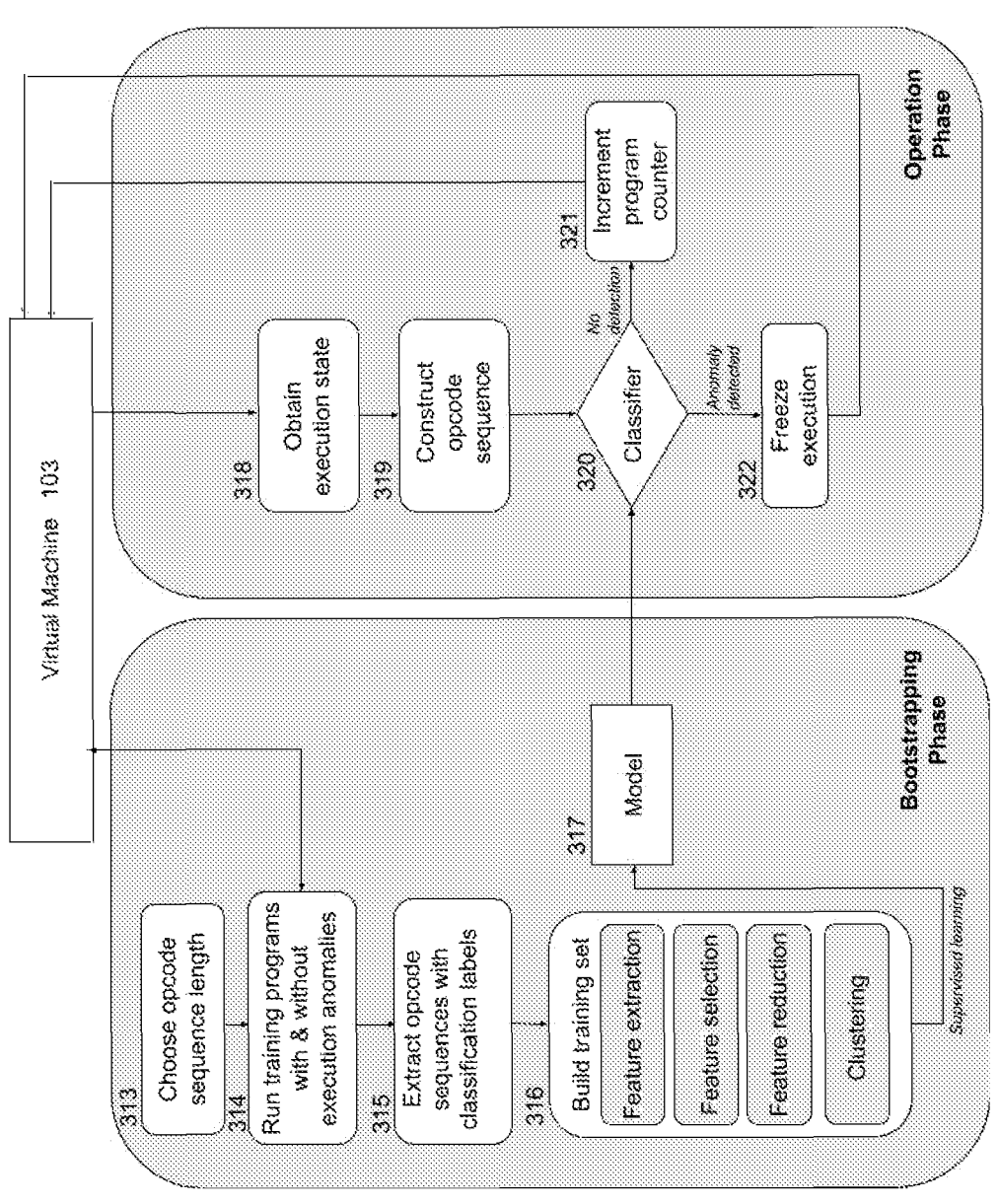
FIG. 8 depicts the workflow for an intelligent mode of configuration with supervised learning.

FIG. 8 depicts the workflow for an intelligent mode of configuration with supervised learning (type 1). As illustrated, this mode configuration is divided into two phases: a bootstrapping phase to train the machine-learning model and an operational phase that runs the model as a classifier to detect anomalies in program opcode sequences and respond to them accordingly. More specifically, in the bootstrapping phase, the administrator user will choose the opcode sequence length as a configuration parameter for the device. Afterward, two sets of training programs are executed inside the virtual machine 103: benign and anomaly-induced programs 314. The result of the execution includes opcode sequences with classification labels (assigned based on a priori knowledge) 315. The training set is built in the following step 316, which includes a number of substeps— feature extraction, selection, reduction, and clustering-to obtain the final training set used for supervised learning of the machine-learning model 317. Next, the workflow switches to the operational phase. In this phase, the target program (i.e., the smart contract) is executed inside the virtual machine 103, whereby the execution state is obtained in executing each opcode 318. The opcode sequence is produced from the trace of the execution 319 and is fed into the classifier to make a decision.

The result of the classifier is a Boolean answer; a negative answer permits the execution of the next opcode 321, while a positive answer causes the virtual machine's execution to freeze 322, which then requires manual intervention (such as a human inspection) of the results.

Figure 9:
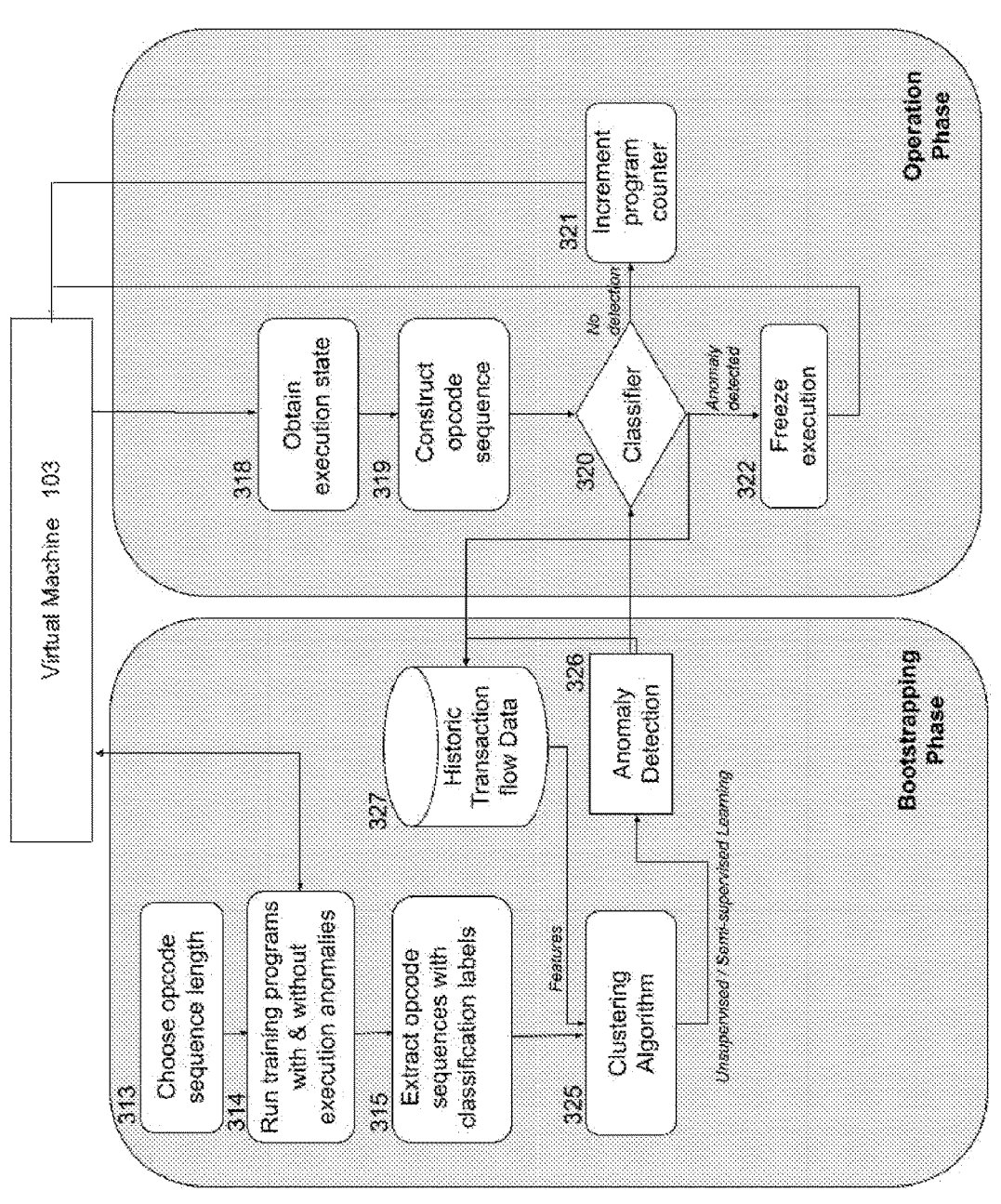
FIG. 9 depicts the workflow for an intelligent mode of configuration of an embodiment with unsupervised and semi-supervised machine learning models.

FIG. 9 depicts the workflow for an intelligent mode of configuration of an embodiment with unsupervised and semi-supervised machine learning models. As illustrated, both configurations operate in two phases: a bootstrapping phase to train the machine-learning model (types 2 & 3) and an operational phase to run the model as a classifier for the detection of anomalies in program opcode sequences in real time for online recovery of the smart contract. However, the difference between the two is that the former uses a clustering method in its bootstrapping phase that converges algorithmically to produce disjoint sets of the data points, which are later used as ground truth for classification. Conversely, a semi-supervised learning method would relax this constraint through an intervention of the setup process by supervised labeling of the data points to repair distortion of the clustering algorithm. After the model 317 is built, it is used by the classifier 320 to detect opcode sequence patterns 318, 319 of fraudulent transactions and/or security breaches within the runtime execution of the smart contract program inside the virtual machine 103. Similar to supervised learning mode, the decision of the classifier determines the course of execution. A negative answer 321 from the classifier resumes execution of the next opcode inside the virtual machine 103, while a positive answer causes the virtual machine's execution to freeze 322, thereby requiring manual intervention (i.e. human inspection) of the results.

This disclosure presents example embodiments 200, which comprise a virtual machine 103, the SmartStation 201, and the AutoGuard 202. The device 200 is an upgraded node of the DLT, designed to deliver trusted execution of the smart-contract program by monitoring the state and operations of execution inside the embedded virtual machine 103 and responding instantaneously to execution anomalies or incidents invoked by a malicious agent. The device 200 also examines TXINs to ensure only authorized users are allowed and that function calls to the smart contract are safe for execution.

The following steps describe a process for validating the TXIN 111, using an embodiment 200, before it is passed internally to the virtual machine 103.

STEP 0: In setting up the device, the administrator imports a number of files to configure it 200. These files include the policy rules 213, regular expression patterns 214, and revocation list 215.

STEP 1: To begin the execution, the caller 102 invokes a function call by creating a TXIN to the distributed ledger 100. The TXIN is transmitted as a request from the user's computer or from an external contract. On receipt, the device 200 will process the TXIN and route it internally to the AutoGuard 202.

STEP 2: To validate it, the AutoGuard 202 passes the TXIN to the input validator 203 and then to the access control module 204. For the transaction to be accepted, the TXIN must pass both checks; otherwise, it will be rejected.

STEP 3: The regular expression file 214 is loaded into the input validator 203, and the TXIN is parsed. The input validator 203 extracts the payload from the TXIN and uses the regular expressions to filter out malformed inputs because the TXIN is produced by an untrusted source (i.e., an external user or contract). In this way, the input validator seeks to detect and prevent injection of data contained in the function calls that can potentially lead to flaws when executed by the virtual machine 103. These checks may include data type validators, schema validators, type conversion, and minimum and maximum value range validation.

STEP 4: Next, the input validator 203 returns a Boolean result that is passed to the policy decision point module 211 inside the AutoGuard 202.

STEP 5: The sender address A; is extracted from the TXIN and used to query the access control 204 table. The output of the search is the access object L, which represents the list of functions or state variables in the smart contract that is visible for A;. 0; is forwarded to the policy decision point module 211.

STEP 6: The policy decision point module 211 obtains the revocation list 215 (A;, 0;) from the access control module 204, the Boolean result from the input validator 203, and the extracted payload from the TXIN 111. With this information, it sends a response to the policy enforcement point module 212 to accept or reject the TXIN 111.

STEP 7: If the TXIN is accepted, the AutoGuard 202 passes it to the virtual machine 103, which stores it in a transient buffer 111. The payload is extracted from the TXIN and stored in virtual read-only memory 112 to prepare it for execution. Other transaction data fields are also extracted from the TXIN and stored in a non-volatile area 115.

The following describes the data flow when executing a smart contract that is monitored by an embodiment 200.

STEP 0: Initially, the user creates an account on the distributed ledger 100 by generating cryptographic keys to interact with the smart contract. Likewise, the owner of the contract creates an account to deploy an instance of the contract on top of the distributed ledger 100. As a result, an address is generated to reference the instance of the contract.

STEP 1: The contract bytecode 112 is executed as a sequence of opcodes that follow the program control flow: the interpreter executes standard assembly operations such as XOR, AND, ADD, and SUB. Program execution is determined by the PC register 113. This register 113 is a processor that contains the address of the next operation to be executed. For each cycle, the opcode referenced by the PC register is fetched from the contract bytecode 112 and stored in a special register 121 inside the interpreter.

STEP 2: The cycle of execution in the state machine of the interpreter 120 is as follows: the opcode register 121 relays the data to a decision-maker 122 who checks the type of fee associated with the opcode. If the opcode is a revert operation, then a refund 123 of gas is returned to the output transaction. Otherwise, a gas amount is deducted 124 from the balance of the TXIN before the operation is executed 125.

STEP 3: After the opcode is executed, the result is checked 126. If an exception is made, the transaction is reverted 131 and the machine halts immediately, with no state changes. Otherwise, the program is checked for remaining opcodes 127. If the program terminates successfully, the result of the call is returned to the user 102, and an output transaction (TXOUT) is sent to the distributed ledger (100). However, if there are more opcodes to execute, the program proceeds to the next step.

STEP 4: The transaction's balance is checked 128 to see if there is any remaining gas. As mentioned previously, code execution depletes the gas, but it may not all have been used. If it has been, the execution ends before the code has come to a natural halting state, and an out-of-gas exception occurs, thereby forcing the transaction to revert 131.

STEP 5: If the gas balance check 128 is passed, the state of the execution is updated. Specifically, the update may include a push/pop to the stack 114 or a read/write to the storage 115 and memory 116. It is important to note that program execution follows the stack-machine model. This means function calls and operations consider data by passing parameters with a push to the stack and return a result by consuming data with a pop from the stack. The final check 129 identifies whether the operation is an external call to an outside smart contract, in which case a transaction is emitted to make the call.

STEP 6: If the operation is a call to an external contract, a message call transaction 130 is sent to the distributed ledger 100. Otherwise, it goes on to the next check in the execution loop.

STEP 7: In the final step, the flow of execution is determined by the Boolean input it receives from the SmartStation 201. If an anomaly has been detected, the SmartStation 201 sends a Boolean "true" (i.e., yes) to the virtual machine 103, causing the transaction to revert 131. Otherwise, the control is returned to the execution loop, and the next opcode is executed 121.

The SmartStation 201 monitors the state of the virtual machine 103. In each cycle, it reads the contents of the bytecode 112, PC 113, stack 114, storage 115, and memory 116. It also accesses the content of the world state 104 and the global namespace 105.

As the contract program continues to execute, the SmartStation 201 builds an execution trace in real time by recording the sequence of executed opcodes. Based on this, it builds the execution trace and the state of the virtual machine 103 to detect anomalies. Specifically, this process involves the following steps:

STEP 1: When an anomaly is detected, the SmartStation 201 freezes the execution of the virtual machine 103.

STEP 2: The SmartStation sends an alert message to the operator 205, who may be a human, reactive machine, or machine learning operator.

STEP 3: In response, the operator enters a command that the SmartStation will process. If it is the revert command, the SmartStation signals a Boolean "true" to the virtual machine 103, causing the transaction to revert.

STEP 4: As a result, the state of execution in the memory 116 is cleared, and no changes are committed to the distributed ledger 100, with no broadcasts sent to the network 100.

STEP 5: If the operator sends the resume command, the execution state is preserved, and the execution continues to the next opcode.

STEP 6: If the operator 205 sends the freeze command, the virtual machine 103 is set to freeze, and no execution can be performed until it is resumed by the operator.

According to an embodiment, a small per-transaction payment may be added to an account of an administrator of embodiments of the disclosure, in addition to the payment to the protected smart contract's owner. This enables charging users of the contract with a small fee for the use of the embodiments and the contract Ownership of the contract is determined by a field in the blockchain where the contract is deployed. The address of the administrator is implemented as a system-wide variable that can be referenced globally within the codebase of the contract. The contract implements a payable routine that is called when initializing the contract and forwards it to both accounts.

Embodiments have been disclosed herein, and although certain specific terms are employed, they are used and are to be interpreted in a generic and descriptive sense only and not for purpose of limitation. Accordingly, it will be understood by those of ordinary skill in the art that various changes in form and details may be made without departing from the spirit and scope of the disclosure as set forth herein.

What is claimed is:

1. One or more devices providing improved pre-execution security for a smart contract or distributed application executing on a virtual machine, the one or more devices including one or more network interfaces, one or more processors, and one or more memories including instructions that upon execution by the one or more processors cause the one or more devices to perform operations comprising:

receiving, via the one or more network interfaces, a transaction initiated by a caller with the smart contract or distributed application of the virtual machine;

examining contents of the transaction to determine, using a plurality of stored security enforcement files stored in the one or more memories, whether the contents of the transaction include attributes satisfying a plurality of criteria for access to the smart contract or distributed application;

rejecting the transaction to the smart contract or distributed application upon determining that the contents of the transaction do not include the attributes satisfying the plurality of criteria; and transmitting, via the one or more network interfaces, the transaction to the smart contract or distributed application upon determining that the contents of the transaction do include the attributes satisfying the plurality of criteria, wherein examining the contents of the transaction includes applying one or more regular-expression patterns stored in the security enforcement files to validate formats of transaction fields.

2. The one or more devices of claim 1, wherein the plurality of stored security enforcement files include a whitelist of acceptable formats of contents of the transaction.

3. The one or more devices of claim 1, wherein the plurality of stored security enforcement files includes a whitelist of caller addresses.

4. The one or more devices of claim 3, wherein the examining of the contents of the transaction to determine whether the contents of the transaction include attributes satisfying the plurality of criteria further includes determining, by referring to the whitelist of caller addresses, whether an address of the caller is whitelisted for objects specific to the smart contract or distributed application.

5. The one or more devices of claim 3, wherein the examining of the contents of the transaction to determine whether the contents of the transaction include attributes satisfying the plurality of criteria further includes determining, by referring to the whitelist of caller addresses, whether the caller has been granted execution privileges.

6. One or more devices providing improved during-execution security for a smart contract or distributed application executing on a virtual machine, the one or more devices including one or more network interfaces, one or more processors, and one or more memories including instructions that upon execution by the one or more processors cause the one or more devices to perform operations comprising:

receiving an instance of about real-time information regarding a state of the virtual machine during execution of the smart contract or distributed application;

examining the instance of about real-time information to determine, using a rules engine stored in the one or more memories, whether an anomaly is present within the instance of about real-time information;

freezing the execution of the smart contract or distributed application upon determining that the anomaly is present within the instance of about real-time information; and sending a resume command to continue the execution of the smart contract or distributed application upon determining that the anomaly is not present within the instance of about real-time information, or upon receiving a resume instruction, wherein the instance of about real-time information comprises a snapshot of the virtual machine including storage, memory, stack, and register data.

7. The one or more devices of claim 6, wherein an output alert is generated upon the determining that the anomaly is present within the instance of about real-time information, and awaits a response.

8. The one or more devices of claim 7, wherein the output alert results in a resume selection causing the one or more devices to forward the resume selection to the virtual machine to resume the execution of the smart contract or distributed application.

9. The one or more devices of claim 7, wherein the output alert results in a freeze selection causing the one or more devices to continue the operation of freezing the execution of the smart contract.

10. The one or more devices of claim 7, wherein the output alert results in a revert selection causing the one or more devices to forward the revert selection to the virtual machine to revert the execution of the smart contract or distributed application.

11. The one or more devices of claim 6, wherein the operations further comprise:

receiving, via the one or more network interfaces, a transaction initiated by a caller with the smart contract or distributed application of the virtual machine;

examining contents of the transaction to determine, using a plurality of stored security enforcement files stored in the one or more memories, whether the contents of the transaction include attributes satisfying a plurality of criteria for access to the smart contract or distributed application;

rejecting the transaction to the smart contract or distributed application upon determining that the contents of the transaction do not include the attributes satisfying the plurality of criteria; and transmitting, via the one or more network interfaces, the transaction to the smart contract or distributed application upon determining that the contents of the transaction do include the attributes satisfying the plurality of criteria.

12. The one or more devices of claim 11, wherein an output alert is generated upon the determining that the anomaly is present within the instance of about real-time information, and awaits a response.

13. The one or more devices of claim 7, wherein the response to the output alert is generated by one or more separate devices that include a readable memory and that are in communication with the one or more devices.

14. The one or more devices of claim 13, wherein the one or more separate devices comprise a human-operated computing device.

15. The one or more devices of claim 13, wherein the one or more separate devices comprise a reactive computing device.

16. The one or more devices of claim 13, wherein the one or more separate devices comprise a machine-learning-operated device.

* * * * *